United States Patent [19]

Day et al.

[11] 4,200,505

[45] Apr. 29, 1980

[54] ELECTROCHEMICAL CONVERSION OF ORGANIC MATERIAL

[76] Inventors: Donald L. Day, 2409 John Dr., Urbana, Ill. 61801; Marvin P. Steinberg, 40 O'Connor Ct., Champaign, Ill. 61820

[21] Appl. No.: 26,666

[22] Filed: Apr. 3, 1979

[51] Int. Cl.$^2$ .............................................. C02C 5/12
[52] U.S. Cl. .................... 204/149; 204/131; 204/151; 204/DIG. 3; 204/DIG. 4
[58] Field of Search ............... 204/130, 131, 149, 151, 204/152, DIG. 3, DIG. 4

[56] References Cited

U.S. PATENT DOCUMENTS

| | | | |
|---|---|---|---|
| 3,180,813 | 4/1965 | Wasp et al. | 204/DIG. 4 |
| 3,711,392 | 1/1973 | Metzger | 204/151 X |
| 3,725,226 | 4/1973 | Stoner | 204/149 |
| 3,829,368 | 8/1974 | Wesley | 204/149 |
| 3,925,176 | 12/1975 | Okert | 204/149 X |
| 3,937,023 | 2/1976 | Williamson | 204/149 X |
| 3,975,247 | 8/1976 | Stralser | 204/149 X |
| 4,053,395 | 10/1977 | Switzgable | 204/149 X |

*Primary Examiner*—Arthur C. Prescott
*Attorney, Agent, or Firm*—David V. Munnis

[57] ABSTRACT

Animal waste conversion into animal feed in a process and system including an electrochemical cell in which cell electrolytic conditions are controlled to promote growth of waste aerobic bacteria, without forming oxygen bubbles, and to produce hydrogen bubbles which are collected in the cell and then, in a fuel cell, converted into D.C. electricity that is utilized to supply the major portion of the electricity employed in the conversion cell. The system and process utilizes relatively concentrated waste liquor feeds to the conversion cell, e.g., from about 15% to about 10% total solids, and is adapted for continuous operations, e.g., as a supplemental feed-producing compliment to livestock-raising operations.

10 Claims, 5 Drawing Figures

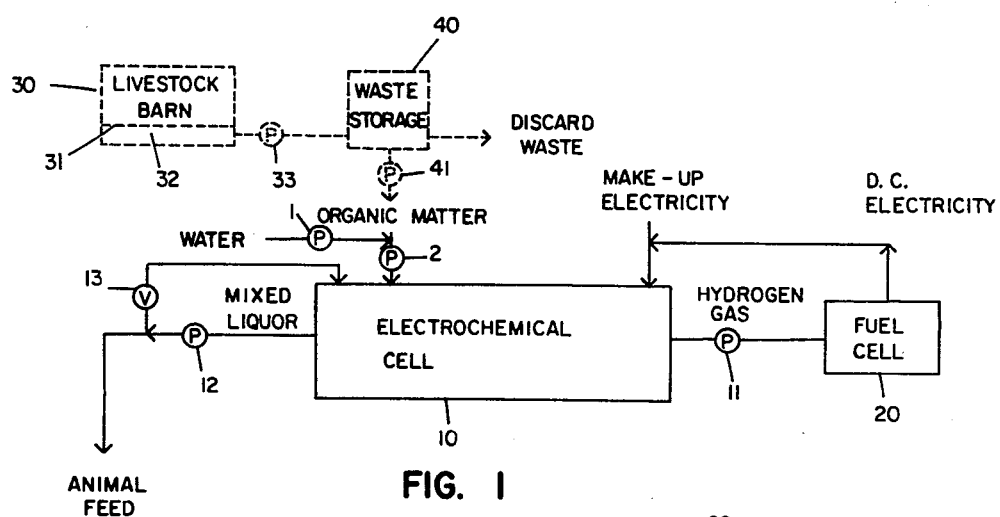
FIG. 1
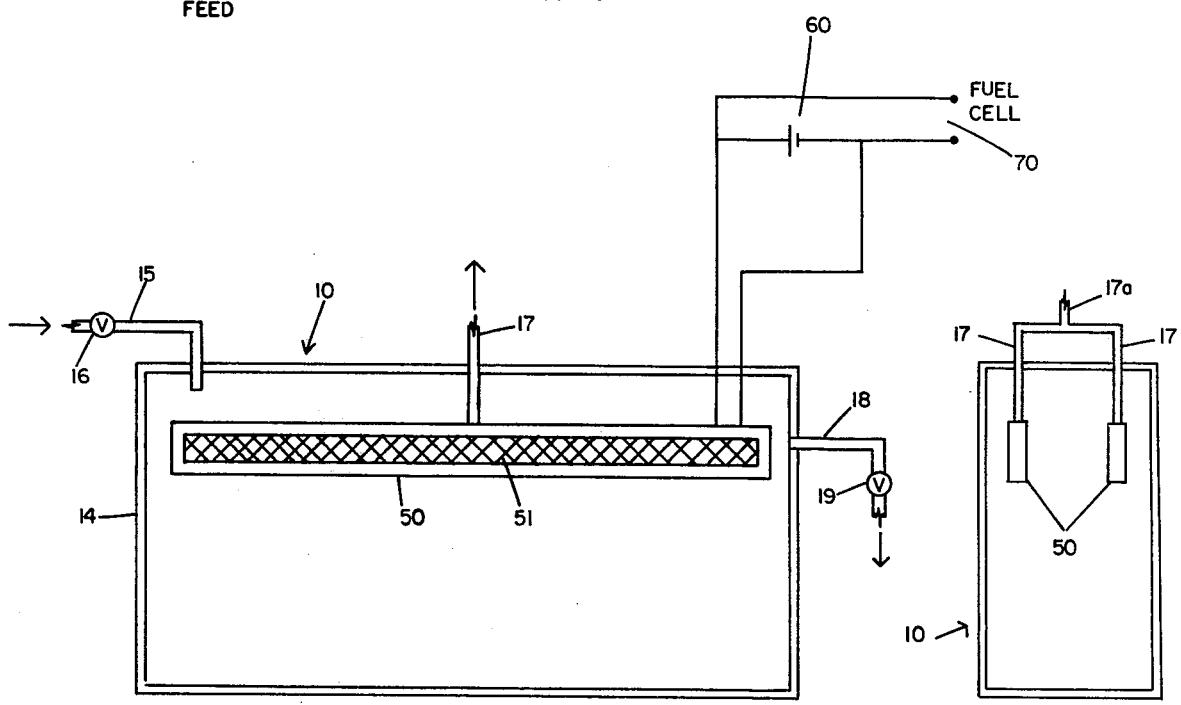
FIG. 2
FIG. 3
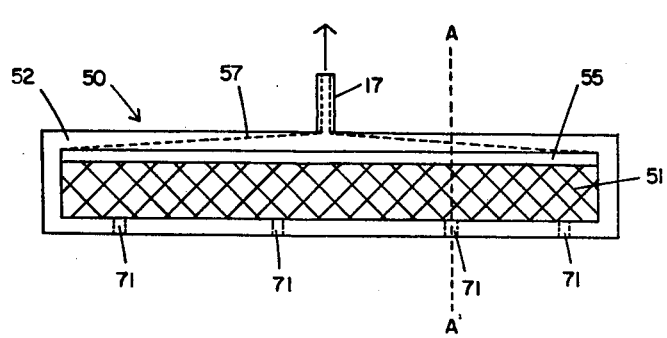
FIG. 4
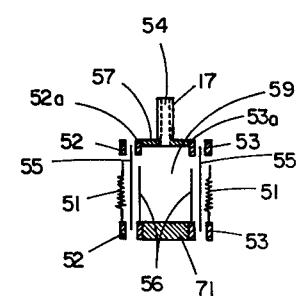
FIG. 5

ELECTROCHEMICAL CONVERSION OF ORGANIC MATERIAL

BACKGROUND OF THE INVENTION

Livestock-raising operations have long been plagued by problems attendant the odor and disposal of excrement waste products inherently produced in such programs. In most operations waste odors are merely tolerated, and an attempt is made to dispose of at least some of the wastes as fertilizer by on-site use or through sale. Other approaches have suggested the use of electrolytic treatment of the wastes to destroy odor-producing bacteria. Another solution heretofore suggested has entailed attempts to convert the wastes to protein-rich materials useful as feed supplements by subjecting the wastes to mechanical aeration under conditions which cause the aerobic bacteria in the wastes to propagate using the available nitrogen, carbon, vitamins and minerals in the wastes as nutrients.

Such prior electrolytic waste treatments, while successful in the main in solving the odor problem, have not been satisfactory due to being too expensive and in failing to provide a totally attractive solids end product. Similarly, approaches utilizing a mechanical aeration of the wastes have not been economically attractive, in spite of producing supplemental feed products, since the power requirements for the mechanical processing are essentially prohibitive.

Accordingly, a search has continued in the art for an attractive alternative technique for treating animal wastes, and particularly for such a treatment producing useable protein.

Objects of the Present Invention

Thus, it is the primary object of the present invention to provide a process for treating animal wastes which offers a solution to the odor and disposal problems attendant livestock-raising operations.

Another object of the present invention is to provide a process for treating animal excrement wastes which advantageously converts the wastes into useable protein.

An additional object of the present invention is to provide a process for converting animal wastes into useable protein which requires the utilization of less power than waste-to-protein conversion techniques previously suggested.

A further object of the present invention is to provide a process for converting animal wastes into useable animal feed supplements which is adapted for continuous complimental use in livestock-raising operations.

Yet another object of the present invention is to provide a process for converting animal wastes into protein which internally produces a portion of the power requirements of the process.

Still an additional object of the present invention is to provide an improved system for converting animal wastes into useable protein.

The above and other objects are achieved and are features of the process and system of the present invention which shall be described hereinafter.

BRIEF DESCRIPTION OF ATTACHED DRAWINGS

The present invention will be described below in greater detail with particular reference being made to the attached drawings of which:

FIG. 1 is a schematic drawing showing the process and system of the present invention;

FIG. 2 is a schematic side elevation view, broken away, illustrating an electrochemical cell arrangement utilized in preferred embodiments of the process and system of the present invention;

FIG. 3 is a schematic end view, broken away, further illustrating the electrochemical cell arrangment employed in preferred embodiments of the process and system of the present invention;

FIG. 4 is a front elevation schematic view depicting an electrode assembly utilized in preferred embodiments of the present invention; and FIG. 5 is a side elevation schematic view, partially exploded, further showing the electrode assembly utilized in preferred embodiments of the present invention, being a sectional view of FIG. 4 taken along line A-A'.

DESCRIPTION OF SPECIFIC EMBODIMENTS OF THE INVENTION

With reference to FIG. 1, numeral 10 generally designates an electrochemical cell in which biodegradable organic matter is converted into protein in accordance with the present invention. Such "biodegradable organic matter" suitably may be any material which provides an aqueous liquor which is growth-promoting of aerobic microorganisms, including animal excrement wastes, domestic and industrial sewages, and the like.

In a preferred application of the present invention, the biodegradable organic matter is animal waste, including fecal excrement and urine, collected from any available area, such as a livestock barn 30, by any suitable means. In such applications, a preferred technique for collecting the animal wastes utilizes a ditch 32 located beneath a slotted floor 31 in barn 30. The wastes so collected may be passed by a suitable system of conveying means 33 and 41, e.g., augers, pumps and the like, to cell 10, with a portion optionally being temporarily stored in a storage area 40, for later feed to cell 10 or for discard from the system in another use, e.g., as fertilizer.

Preliminary to being fed into cell 10 the biodegradable matter suitably may be, and preferably is, diluted with water from a supply means 1 and the resultant liquor passes by feed control means 2 into cell 10, with any desired and/or necessary addition of buffering agents and/or aerobic microorganism-containing inoculum being simultaneously carried out. In accordance with the present invention, the concentration of the cell feed liquor may vary widely, although a particular feature of the present invention is the ability advantageously to utilize highly concentrated feed liquors as compared to conventional sewage electrolytic purification treatments. More specifically, while such conventional treatments utilize a sewage having a solids content of under 0.1%, feed liquors utilized in the present process suitably and typically have total solids contents of at least about 0.3, ranging up to and over 5, percent by weight, and biochemical oxygen demand contents of at least about 1000, ranging up to and over 5000, milligrams per liter. In the more preferred embodiments, such contents do not include larger particles, such as hair and corn stalk pieces, which have been removed previously in an optional filtration step.

In cell 10 the biodegradable liquor is subjected to direct current passed through the liquor by spaced, dimensionally stable electrodes connected to an external D.C. source 60 to provide at least one, and preferably more than one anode-cathode electrode pair, with the electrolytic treatment of the liquor electrolyte being controlled to form hydrogen bubbles at the cell cathodes, to maintain the cell anodes essentially free of oxygen bubbles, and to effect the propagation of aerobic bacteria in the liquor. Advantageously, it has been found that the desired electrochemical effect is produced at relatively low voltages and current densities. More specifically, cell 10 in the present invention suitably and typically is operated at voltages in the range of from about 1.6 to about 3.2 volts, and current densities in the range of from about 0.3 to about 1.2 amps per square foot, with the more preferred embodiments utilizing animal waste liquor feeds operating at a voltage in the range of from about 1.6 to about 3.0 volts and a current density in the range of from about 0.40 to about 1.0 amp per square foot.

In accordance with the present process, such operation of cell 10 provides a further advantageous feature. By a proper placement of the electrodes, ie., at the surface of the electrolyte liquor, and selecting electrodes of sufficient length, ie., such that they essentially span the length of cell 10, cell 10 can be operated continuously, with feed liquor continuously being added at one end and an aerobic bacteria-rich effluent, which is consumable by animals, being recoverable continuously as an overflow stream from the other end of cell 10. FIGS. 2–3 illustrate such a cell arrangment wherein cell 10 is formed by a reservoir 14 having a plurality of electrode pair assemblies 50 located therein at the surface of the electrolyte liquor and extending essentially the length of reservoir 14, whereby feed liquor is continuously fed into cell 10 via line 15 and metering means 16, and protein-rich effluent is continuously removed from cell 10 through overflow line 18 and discharge metering means 19. Stirring, preferably by magnetic means, should be provided.

In accordance with the present invention, cell 10 is provided with means 17 for collecting hydrogen formed at the cell's cathodes, and, as shown in FIG. 1, the so collected hydrogen is then passed to a fuel cell 20 via a suitable conveying means 11, eg., a blower, wherein in fuel cell 20 the hydrogen gas is converted to D.C. electricity by conventional means, with the electricity so produced being "recycled" in the process to be used with make-up electricity from D.C. source 60 to power electrode assemblies 50 of cell 10. Advantageously, by means of this feature of the present invention up to and over 70% of power required to conduct the electrochemical treatment can be produced internally in the system.

To improve the efficiency of the cell 10 and to promote the advantageous electrochemical effects of the present invention, the spacing between the anode and cathode of electrode pairs in cell 10 are maintained relatively small, with suitable and typical spacings being less than 0.25 inch, more usually in the range of from about 0.01 to about 0.1 inch.

In the more preferred embodiments of the present system, the electrode pairs employed are separated by a sheet of material permeable to the electrolyte liquor. The resulting "sandwich" assembly further assists in the recovery and collection of hydrogen from the cathodes. FIGS. 4 and 5 illustrate an embodiment of such preferred electrode assemblies, with numeral 50 generally designating an assembly consisting of two sandwiches formed each by a cathode sheet 56 mounted conventionally on an insulating support 52a, an anode sheet 51 mounted on a conventional insulating support 52, and a sheet of electrolyte-permeable material positioned between cathode 56 and anode 51 and maintained in place by supports 52 and 52a. Assembly 50 is also provided with spacer members 71 at its bottom and baffle member 57 at its top to provide an internal space 59 between the electrode pairs for passage of electrolyte fluid. In the assembly membranes 55 serve to deflect hydrogen formed at cathodes 55 up through space 59, along baffle member 57, and out of cell 10 through line 17 which converges with other similar lines 17 of the cell to form line 17a to fuel cell 20. In electrode assembly 50 connection of electrodes 51, 55 to the source of direct current is by conventional means, not shown.

In accordance with the present invention, the anode and cathode suitably may be formed from any available material which is dimensionally stable to the conditions of the process and include materials conventionally suggested for use in sewage electrolytic purification techniques. The more preferred material for use as the anode is a wire mesh formed of titanium with a ruthenium oxide coating, available from Diamond Shanrock Corporation; for the cathode, the preferred material surprisingly was found to be either galvanized sheet metal or such material with the galvanizing removed. The preferred diaphrams for use in providing separater sheets 55 were formed from cotton and cotton-polyester fabrics.

EXAMPLE

An electrochemical cell of the type shown in FIGS. 2–5 having a capacity of 10 liters was employed to treat a sample of swine excrement wastes diluted with water to a total solids content of about 0.3% and a chemical oxygen demand of about 1090 p.p.m. The anodes were titanium mesh coated with ruthenium oxide, the cathodes were galvanized sheet metal, the diaphrams were cotton cloth, with the electrode pairs having an area of about 42 square inches each, and a spacing provided only by the thickness of the cotton cloth. The feed liquor was buffered to a pH of 6.9–7.0 with a phosphate buffer solution. The cell was operated applying a voltage of about 2.8 volts and a current of 250 milliamps D.C. electricity for 550 hours, with feed being added continuously at about 10 ml/hr and effluent being continuously being withdrawn as overflow. A magnetic stirrer was employed.

During operation of the cell, hydrogen bubbles were formed at the cathodes and collected overhead. The so collected hydrogen is passed to a fuel cell where it is converted to DC electricity recycled to the cell. No oxygen was observed to form at the anodes.

The resultant effluent produced was essentially free of animal excrement odors, contained about 540 P.P.M. of chemical oxygen demand, about 130 p.p.m. soluble protein, and about 590 p.p.m. single-cell protein, and was suitable as an animal feed supplement. In the process about 68 ml/hr of hydrogen was recovered which, when converted in the fuel cell, provides about 70% of the DC electricity required.

While the above process is limited to the use of the collected hydrogen in a fuel cell to provide DC electricity which is recycled to the electrochemical cell, it will be further understood, that the present invention also embraces embodiments wherein at least some or all of the collected hydrogen is sold and the proceeds therefrom are utilized to defer the costs of the electrochemical cell operation.

In most instances, the process of the present invention is operated at ambient room temperatures, but it will be understood that the present invention embraces embodiments utilizing elevated temperatures, eg., ranging up to and over 60 degrees C., so long as the temperatures do not unsatisfactorily impede the growth of desired microorganisms.

What is claimed is:

1. A process for the electrochemical conversion of organic waste matter into animal feed comprising passing an aqueous mass of biodegradable organic matter comprising aerobic bacteria and having a total solids content of at least about 0.3% by weight and a biochemical oxygen demand of at least about 1,000 milligrams per liter in to an electrolytic cell, subjecting said aqueous mass to electrochemical action in said cell by passing DC current therethrough to form hydrogen bubbles at the cathode of said cell, to maintain the anode of said cell essentially free of oxygen bubble formation, and to effect the growth of said aerobic bacteria, continuing said electrochemical treatment of said aqueous mass until said mass is essentially free of odors of said organic matter starting material, during said electrochemical treatment collecting said hydrogen formed, utilizing at least a portion of the said collected hydrogen to provide a portion of the electric requirements of said cell, and recovering from said cell an aerobic bacteria-rich effluent consumable by animals.

2. The process according to claim 1 wherein said aqueous mass comprises animal wastes.

3. The process according to claim 1 wherein at least a portion of said collected hydrogen is converted into electrical energy in a fuel cell and said electrical energy from said fuel cell is utilized to provide a portion of the electrical requirements of said electrochemical cell.

4. The process according to claim 1 wherein said steps are carried out continuously and said aerobic bacteria-rich effluent is obtained as an overflow stream from said electrochemical cell.

5. The process according to claim 1 wherein said electrochemical cell is operated with the aqueous mass feed stream having a total solids content in the range of from about 1 to about 10% by weight, a voltage in the range of from about 1.6 to about 3.2 volts, and a current density in the range of from about 0.3 to about 1.2 amps per square foot.

6. The process according to claim 1 wherein the spacing between the anode and cathode in said electrochemical cell is less than about 0.25 inch.

7. The process according to claim 1 wherein the anode of said cell is formed of titanium mesh coated with ruthenium oxide and the cathode of said cell is formed of galvanized sheet metal.

8. The process according to claim 1 wherein said anode and said cathode of said cell are separated by a diaphragm of a material permeable to said aqueous mass being treated in said cell.

9. The process according to claim 2 wherein said steps are carried out continuously and said aerobic bacteria-rich effluent is obtained as an overflow stream from said electrochemical cell.

10. The process according to claim 9 wherein said electrochemical cell is operated with the aqueous mass feed stream having a total solids content in the range of from about 1 to about 10% by weight, a voltage in the range of from about 1.6 to about 3.2 volts, and a current density in the range of from about 0.3 to about 1.2 amps per square foot.

* * * * *